3,531,427
STABILIZED AQUEOUS SOLUTIONS OF ALKYL VINYL ETHER - UNSATURATED POLYBASIC ACID COPOLYMERS
Irene R. Kervenski, Kingston, and Clarence R. Stahl, Easton, Pa., assignors to GAF Corporation, New York, N.Y., a corporation of Delaware
No Drawing. Filed Mar. 2, 1967, Ser. No. 619,952
Int. Cl. C08f 15/02, 45/60
U.S. Cl. 260—29.6                        22 Claims

ABSTRACT OF THE DISCLOSURE

A stabilized composition of matter comprising: (1) an aqueous solution of an interpolymer of (a) an alpha, beta-unsaturated polybasic acid or anhydride and (b) an alkyl vinyl ether; and (2) a stabilizing amount of a synergistic mixture of (a) (ethylenedinitrilo) tetraacetic acid and (b) a second component selected from the group consisting of thiourea, allylthiourea, ammonium thiocyanate, tannic acid, pyrrolidone, vinyl pyrrolidone, pyrogallol, dimethyl sulfoxide, polyvinyl pyrrolidone, sodium diethyldithiocarbamate, resorcinol, gallic acid, 2,2′,4,4′-tetrahydroxybenzophenone, phloroglucinol, tartaric acid, citric acid, gluconic acid, and glycolic acid.

---

The copolymerization of (a) alpha, beta-unsaturated polybasic acids or their anhydrides and (b) vinyl alkyl ethers yields a copylmer which is more properly characterized as an interpolymer wherein both ethylenically unsaturated moieties enter into the formation of the same polymer chain. It has been indicated by infra-red spectroscopy and chemical examination and analyses that vinyl alkyl ethers and alpha, beta-unsaturated acids or anhydrides interpolymerize in the molar ratio of about 1:1, the polymer chain thereof containing alternating alpha, beta-unsaturated acid or anhydride units and vinyl alkyl ether units. The resulting interpolymers are, in general, soluble in aqueous systems upon prolonged contact with water presumably due to the hydrolysis of the anhydride groups and are known to be useful emulsifying and suspending agents. In the aqueous environment, however, it has been found that the interpolymers undergo substantial and serious decomposition, which is manifested by a decrease in the viscosity of solutions prepared from the interpolymer materials. As it is often necessary to prepare specific interpolymers of specified viscosity grade, it is often found that, after suitable processing of the interpolymer, the expected viscosity specifications of the solutions are not met. It has further been ascertained that elevated temperatures cause a more rapid decline in the viscosity grade of the material. Since it is essential in commercial practice to obtain such interpolymers at definite specifications of viscosity, it has become necessary to effect a stabilization of the interpolymers whereby the viscosity of the material will remain substantially unchanged under conditions which normally lead to decomposition and consequent lowering of the viscosity.

In the art, various procedures have been attempted in order to obtain aqueous solutions of the interpolymers which will retain constant viscosities during extended periods of storage. These prior art methods, however, have not been entirely successful as in each instance the viscosity has been found to decrease over substantial periods of storage. These methods have generally involved the addition to the aqueous solutions of the interpolymer of various materials in an effort to effect the desired stabilization of the interpolymers. It has been suggested, for example, that certain thioamides may be employed to stabilize aqueous solutions of the interpolymer. However, these materials have been found useful only for short periods as the stabilizing characteristics become very poor over extended periods. Similarly, the use of (ethylenedinitrilo) tetraacetic acid has been suggested as a stabilizing agent. As with the thioamides, however, this material has not accomplished the purpose. Therefore, as pointed out, none of these prior materials have proven successful in providing aqueous solutions of interpolymers of alpha, beta-unsaturated polybasic acids or anhydrides with vinyl alkyl ethers to enable use of the solutions for commercial specifications over periods of extended storage.

It is accordingly one object of this invention to provide aqueous solutions of interpolymers of (a) alpha, beta-unsaturated polybasic acids with (b) vinyl alkyl ethers which are stable against degradation and/or decomposition.

It is a further object of this invention to provide vinyl alkyl ether-alpha, beta-unsaturated polybasic acid or anhydride interpolymers which are stable against degradation and/or decomposition and retain their viscosity levels over extended periods of time.

It is a still further object of this invention to provide alpha, beta-unsaturated polybasic acid or anhydride-vinyl alkyl ether interpolymers and, particularly, vinyl alkyl ether-maleic acid or anhydride interpolymers which are stable against degradation and/or decomposition in aqueous systems.

It is still another object of this invention to provide vinyl alkyl ether-alpha, beta-unsaturated polybasic acid or anhydride interpolymer compositions which have uniform viscosity characteristics and are stable against degradation and decomposition in aqueous systems.

A still further object of this invention is to provide vinyl alkyl ether-maleic acid or anhydride interpolymer compositions which are stable against degradation and loss of viscosity in aqueous solutions.

Other objects and advantages of the present invention will become more apparent as the description thereof proceeds.

In accordance with this invention, the above objects and advantages are accomplished by the addition thereto, or admixture therewith, of an aqueous solution of an interpolymer of (a) an alpha, beta-unsaturated polybasic acid or anhydride and (b) an alkylvinyl ether with small amounts of a stabilizing mixture of (ethylenedinitrilo) tetraacetic acid and a second stabilizing component as more specifically defined hereinafter. The components of the mixture of the (ethylenedinitrilo) tetraacetic acid and the second stabilizing material are believed to interact in situ so as to produce a synergistic effect in providing extended stabilization of the aqueous system comprising the vinyl alkyl ether-alpha, beta-unsaturated polybasic acid or anhydride interpolymers. As is illustrated hereinafter, this synergistic mixture provides surprisingly greater stabilizing characteristics of the aqueous solution of the interpolymer than is realized from either component alone and thus provides an outstanding and unexpected route to the efficient stabilization of aqueous solutions containing the interpolymer.

According to this invention, stabilization of the interpolymers of the vinyl alkyl ethers-alpha, beta-unsaturated polybasic acids or anhydrides contained in aqueous solutions are achieved by the addition of small quantities of the stabilizing mixture of this invention thereto. The mixture employed to effect the stabilization may be added to the interpolymer contained in aqueous solution, to the solid polymer prior to forming the aqueous solution, or to the aqueous solution before addition of the polymer, as desired. It is preferred, however, to add the stabilizing mixture to the aqueous solution of the interpolymer.

The invention is applicable to interpolymers prepared by the reaction of vinyl alkyl ethers and anhydrides of (a) an alpha, beta-unsaturated polybasic acid or anhydride, with (b) a vinyl alkyl ether, particularly a vinyl alkyl ether where the alkyl group has from 1 to 8 carbon atoms. The interpolymers formed by the reaction of the vinyl alkyl ether and the alpha, beta-unsaturated polybasic acid or anhydride are well known in the art as emulsifying and suspending agents, and a detailed explanation therefore is not deemed to be necessary. As indicated, the polymer may be prepared using either the polybasic acid or anhydride. However, when the polymer is dissolved in an aqueous medium any anhydride group will be hydrolyzed to the acid thus providing an aqueous solution of a vinyl alkyl ether-alpha, beta-unsaturated polybasic acid interpolymer.

The interpolymers are preferably prepared by reacting equimolar quantities of the vinyl alkyl ether and alpha, beta-unsaturated polybasic acid in its anhydride form in a solvent, such as benzene, at a slightly elevated temperature (i.e., 50° C.). It is to be understood, however, that the interpolymers may be prepared by any desirable manner as the method of formation thereof does not constitute the essence of the invention.

The dicarboxylic acid anhydrides employed have the general structure:

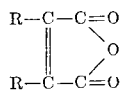

wherein R and R' are selected from the group consisting of hydrogen, halogen, cyano, alkyl, aryl, alkaryl, aralkyl and cycloaliphatic groups. Illustrative anhydrides include maleic anhydride, chloromaleic anhydride, 2,3-dichloromaleic anhydride, 2,3-dicyano maleic anhydride, 2,3-dimethyl maleic anhydride, 2,3-diphenyl maleic anhydride, 2,3-dibenzyl maleic anhydride, 2,3-di (p-methylphenyl) maleic anhydride, 2,3-dicyclohexyl maleic anhydride, 2-methyl maleic anhydride, 2-ethyl maleic anhydride, 2-cyano maleic anhydride, 2-propyl maleic anhydride, 2-phenyl, 2-benyl, 2(p-methylphenyl and 2-cyclohexyl) maleic anhydrides. Maleic anhydride is preferred because of its ready availability and comparatively low cost. The polybasic acid moieties of the polymers of this invention are those which result from the hydrolysis of the anhydride linkage of the above anhydrides.

The vinyl ether monomers employed include vinyl methyl ether, vinyl ethyl ether, vinyl propyl ether, vinyl isopropyl ether, vinyl butyl ethers, vinyl hexyl ethers, vinyl 2-ethylhexyl ether and vinyl octyl ethers. The ethers in which the alkyl group has from 1 to 4 carbon atoms are preferred. Among the preferred class of vinyl ethers are methyl vinyl ether, ethyl vinyl ether, propyl vinyl ethers and the butyl vinyl ethers.

After formation and recovery of the solid polymer by conventional methods, it is dissolved or dispersed in water in the desired appropriate amounts for stabilization according to the teachings of this invention.

According to this invention, solutions of the vinyl alkyl ether-alpha, beta-unsaturated polybasic acid interpolymers are stabilized by the addition thereto or admixture therewith of a stabilizing mixture of compounds comprising a small amount of (ethylenedinitrilo) tetraacetic acid and a second stabilizing material as more precisely defined hereinafter. The (ethylenedinitrilo) tetraacetic acid may be employed as the acid or in the form of its water soluble salts. When used in the form of a salt, the alkali metal and ammonium salts are preferred. Also, partial salts (i.e. those in which 1 to 3 of the carboxylic acid groups have been neutralized) may be used.

The (ethylenedinitrilo) tetraacetic acid is employed in admixture or combination with one or more of the following compounds as the second component of the stabilizing mixture:

Thiourea
Allylthiourea
Ammonium thiocyanate
Tannic acid
Pyrrolidone
Vinyl pyrrolidone
Pyrogallol
Dimethyl sulfoxide
Polyvinyl pyrrolidone
Sodium diethyldithiocarbamate
Resorcinol
Gallic acid
2,2',4,4'-tetrahydroxy benzophenone
Phloroglucinol
Tartaric acid
Citric acid
Gluconic acid
Glycolic acid.

The components of the stabilizing mixture are preferably employed in about equal amounts in forming the stabilizing mixture. Thus, a preferred stabilizing mixture would contain about 50% by weight of each component. However, it is to be understood that other ratios of the components may be employed as desired. Hence, stabilizing mixtures of each component in amounts by weight of about 25% to about 75% are deemed to be within the scope of the present invention.

The (ethylenedinitrilo) tetraacetic acid and the second component, as pointed out hereinabove, may be added to the interpolymer contained in aqueous solution, to the solid polymer prior to dispersion into the aqueous solution or to the aqueous system prior to addition of the polymer as desired. The stabilizing mixture is added in amounts on the order of from about 0.00001% to less than about 1% based on the weight of the interpolymer, which amounts have been found to effect a substantially complete stabilization of the interpolymers with which the invention is concerned. Preferred ranges of stabilizer to be added to the interpolymer aqueous solution range from about 0.0001% to about 0.1% based on the weight of the interpolymer contained in the aqueous solution.

While not desiring to be bound by theory on the reason for the significant stabilizing effect of the stabilizing mixture of this invention, it is believed that the (ethylenedinitrilo) tetraacetic acid and the second component complement each other in serving to stabilize the solution and apparently a synergistic effect is achieved, which synergistic effect is greater than the stabilizing power that either of the individual members of the stabilizing mixture would exhibit if employed individually.

The following examples presented in tabular form will serve to illustrate the present invention without being deemed limitative thereon. Parts are given by weight unless otherwise indicated.

In each of these examples, the relative viscosities of 1% aqueous solutions of an interpolymer formed by the reaction of vinyl methyl ether and maleic anhydride were determined after storage for various periods at room temperature. It is to be appreciated that, as the interpolymer is contained in aqueous solution, the actual interpolymer being stabilized is composed of vinyl methyl ether and maleic acid units, the anhydride units being hydrolyzed to the acid in the aqueous solution. In certain of the examples, it is to be noted that no stabilizer was added to the solution in order to obtain a control solution for comparative purposes. Also, the examples illustrate the comparative stabilizing properties using the (ethylenedinitrilo) tetraacetic acid and additive compound individually.

Determination of the viscosities of the stabilized solutions were made by use of a capillary viscometer.

RELATIVE VISCOSITIES OF 1% AQUEOUS SOLUTIONS OF PVM/MA AFTER STORAGE FOR VARIOUS PERIODS AT ROOM TEMPERATURE

| Stabilizer c | Days at room temperatures | | | | |
|---|---|---|---|---|---|
| | 0 | 21 | 63 | 133 | 267 |
| None | 7.44 | 1.56 | 1.41 | 1.39 | 1.40 |
| Thiourea a | 7.55 | 6.67 | 5.74 | 5.09 | 3.34 |
| Thiourea a plus EDTA a | 7.64 | 6.99 | 6.55 | 6.24 | 5.86 |
| Allylthiourea a | 7.63 | 6.54 | 5.66 | 5.08 | 3.63 |
| Allylthiourea a plus EDTA a | 7.78 | 6.97 | 6.51 | 6.12 | 5.61 |
| Allylthiourea b plus EDTA b | 7.68 | 6.88 | 6.41 | 6.09 | 5.65 |
| EDTA a | 7.78 | 4.83 | 1.52 | 1.27 | |
| Vinyl pyrrolidone a | 7.71 | 2.03 | 1.61 | 1.46 | |
| Vinyl pyrrolidone a plus EDTA a | 7.68 | 6.59 | 5.55 | 4.28 | |
| Ammonium thiocyanate a | 6.85 | 4.75 | 3.58 | 2.55 | |
| Ammonium thiocyanate a plus EDTA a | 6.71 | 6.15 | 5.66 | 5.25 | |
| None | 7.21 | 1.99 | 1.58 | 1.44 | |
| None | 7.27 | 2.32 | 1.88 | 1.45 | |
| Tannic Acid plus EDTA a | 7.53 | 6.88 | 6.13 | 5.37 | |
| Pyrrolidone plus EDTA a | 7.20 | 6.11 | 4.88 | 3.62 | |

| | Days at room temperatures | | | |
|---|---|---|---|---|
| | 0 | 29 | 77 | 135 |
| None | 6.99 | 1.70 | 1.42 | 1.36 |
| Pyrogallol plus EDTA | 7.45 | 6.77 | 6.01 | 5.05 |
| Dimethyl sulfoxide plus EDTA | 7.31 | 6.50 | 5.47 | 4.68 | a 10 mg. per 100 ml. of solution.
b 5 mg. per 100 ml. of solution.
c For 1% aqueous solution of PVM/MA.

Note.—PVM/MA is aqueous solution of interpolymer prepared from vinyl methyl ether and maleic anhydride; EDTA is (ethylenedinitrilo) tetraacetic acid.

While the invention has been described in detail with reference to certain specific embodiments thereof, various changes and modifications which fall within the sphere of the invention and scope of the appended claims will become apparent to the skilled artisan. The invention is intended, therefore, to be limited only by the appended claims or their equivalent.

What is claimed is:

1. A composition of matter stabilized against degradation, decomposition and loss of viscosity comprising (1) an aqueous solution of an interpolymer of (a) an alpha, beta-unsaturated polybasic acid and (b) an alkyl vinyl ether and (2) a stabilizing amount of a mixture containing about 25 to 75% by weight of (ethylenedinitrilo) tetraacetic acid and about 25 to 75% by weight of a second component selected from the group consisting of thiourea, allylthiourea, ammonium thiocyanate, tannic acid, pyrrolidone, vinyl pyrrolidone, pyrogallol, dimethyl sulfoxide, polyvinyl pyrrolidone, sodium diethyldithiocarbamate, resorcinol, gallic acid, 2,2',4,4'-tetroxybenzophenone, phloroglucinol, tartaric acid, citric acid, gluconic acid, and glycolic acid.

2. A stabilized composition of matter according to claim 1 wherein the aqueous solution contains an interpolymer formed by the reaction of vinyl methyl ether with maleic anhydride.

3. A stabilized composition of matter according to claim 1 wherein the stabilizing mixture is present in an amount of from about .00001% to about 1% based on the weight of said interpolymer.

4. A stabilized composition of matter according to claim 1 wherein the stabilizing mixture is present in an amount of from .0001% to about 1% based on the weight of said interpolymer contained in aqueous solution.

5. A stabilized composition of matter according to claim 1 wherein the second component of the stabilizing mixture is thiourea.

6. A stabilized composition of matter according to claim 1 wherein the second component of the stabilizing mixture is allylthiourea.

7. A stabilized composition of matter according to claim 1 wherein the second component of the stabilizing mixture is ammonium thiocyanate.

8. A stabilized composition of matter according to claim 1 wherein the second component of the stabilizing mixture is tannic acid.

9. A stabilized composition of matter according to claim 1 wherein the second component of the stabilizing mixture is pyrrolidone.

10. A stabilized composition of matter according to claim 1 wherein the second component of the stabilizing mixture is vinyl pyrrolidone.

11. A stabilized composition of matter according to claim 1 wherein the second component of the stabilizing mixture is pyrogallol.

12. A stabilized composition of matter according to claim 1 wherein the second component of the stabilizing mixture is dimethyl sulfoxide.

13. A stabilized composition of matter according to claim 1 wherein the second component of the stabilizing mixture is polyvinyl pyrrolidone.

14. A stabilized composition of matter according to claim 1 wherein the second component of the stabilizing mixture is sodium diethyldithiocarbamate.

15. A stabilized composition of matter according to claim 1 wherein the second component of the stabilizing mixture is resorcinol.

16. A stabilized composition of matter according to claim 1 wherein the second component of the stabilizing mixture is gallic acid.

17. A stabilized composition of matter according to claim 1 wherein the second component of the stabilizing mixture is 2,2',4,4'-tetrahydroxybenzophenone.

18. A stabilized composition of matter according to claim 1 wherein the second component of the stabilizing mixture is phloroglucinol.

19. A stabilized composition of matter according to claim 1 wherein the second component of the stabilizing mixture is tartaric acid.

20. A stabilized composition of matter according to claim 1 wherein the second component of the stabilizing mixture is citric acid.

21. A stabilized composition of matter according to claim 1 wherein the second component of the stabilizing mixture is gluconic acid.

22. A stabilized composition of matter according to claim 1 wherein the second component of the stabilizing mixture is glycolic acid.

References Cited

UNITED STATES PATENTS 2,864,803  12/1958  Jones.
2,917,477  12/1959  Suen et al.
3,010,929  11/1961  Jones.

FOREIGN PATENTS 252,741  6/1964  Australia.

MURRAY TILLMAN, Primary Examiner
W. J. BRIGGS, Jr., Assistant Examiner

U.S. Cl. X.R.
260—45.85, 45.9, 45.95, 78.5